Patented Nov. 16, 1937

2,099,659

UNITED STATES PATENT OFFICE 2,099,659

STERILIZATION OF LYOPHILIC BIOLOGICALLY ACTIVE SUBSTANCES

John Reichel, Philadelphia, Pa., assignor to Sharp & Dohme, Incorporated, Philadelphia, Pa., a corporation of Maryland No Drawing. Application March 16, 1937, Serial No. 131,259

8 Claims. (Cl. 167—78)

This invention relates to the sterilization of lyophilic biologically active substances and includes the new sterilized substances and methods of producing them.

This application is a continuation in part of my prior application Serial No. 709,192 filed January 31, 1934.

In my Patent No. 2,066,302, granted December 29, 1936, I have described the production of new lyophilic biologically active substances from sera, etc., by rapid freezing of the fresh liquid material and removal of water from the solid frozen material while it is in a solid frozen state and without melting or softening of the material, by the application of a high vacuum thereto.

In some cases the serum or other liquid biologically active substance is not sterile and requires sterilization before it is converted into the form of the new lyophilic substance. In some cases, the lyophilic substance may itself become contaminated after it is prepared and before it is used, particularly where it has to be handled and restored to a liquid state under conditions where sterility is not maintained.

It is common practice to incorporate in liquid sera and the like a small amount of a sterilizing agent before or at the time the material is introduced into containers for distribution. For this purpose, phenols and cresols are most commonly used; but organic mercurial preparations have been used to some extent. However, when organic mercurials are introduced into liquid sera or other biologically active substances in this way, they tend, in the course of time, to become bound with the serum or otherwise become inert, so that after even relatively short periods of time they exert no sterilizing action.

I have found that if a suitable organic mercurial be introduced into a liquid serum or other biologically active substance in a suitable amount to sterilize the material, and the liquid substance be then converted into a solid lyophilic state by a suitable process, such as that described in my said Patent No. 2,066,302, the mercurial preparation not only serves to sterilize the biologically active substance when introduced therein, but also retains its preservative or sterilizing properties so that when the lyophilic material is restored to a liquid state by the addition of aqueous liquid thereto, even after many months, the mercurial preparation still exerts a sterilizing action. It has also been found that the organic mercurial preparations have important advantages over such materials as phenols and cresols, which are commonly used in liquid biologically active substances, for use in the solid lyophilic biologically active substances in view of the fact that they are not removed during the process of removing the water as are the phenols and cresols. For example, if a serum treated with the usual amount of phenol be subjected to the desiccation process of my said patent, approximately 60% of the phenol is removed with the water, with the result that when the resulting lyophilic product is restored by the addition of water, there is insufficient phenol present to sterilize the restored solution; whereas when an organic mercurial is introduced into the liquid substance, no appreciable amount is removed with the water.

The present invention is based upon the discovery that certain of the mercurial preparations can be added to such biologically active substances in comparatively small quantities which are sufficient, however, to be actively germicidal when added and which retain their germicidal activity for long periods of time providing the biologically active substance be converted to a solid lyophilic state within a reasonably short time after the addition of the mercurial preparations, e. g., within a few hours. These mercurial preparations do not precipitate any of the original substances, do not crystallize out in the dilutions employed, and are such as to permit concentration, when water is removed, to about tenfold the original concentration without affecting adversely the lyophilic product or the liquid product restored therefrom by the addition of water.

The mercurial preparations which have been found effective are the true organic mercury compounds, as distinguished from simple salts of mercury with organic or inorganic acids, in which at least one bond of the mercury atom is linked directly to a carbon atom. In general, the aliphatic organic mercurials of this type are not as useful as are the aromatic derivatives, in which at least one bond of the mercury is linked directly to a carbon atom of an aromatic ring structure, the other bond of the mercury being linked to any one of a widely diversified group of radicals, including the hydroxyl radical and acid radicals of organic or inorganic acids such as acetic acid, hydrochloric acid, nitric acid, etc.; or in which the other bond of the mercury may be linked to a carbon atom of an organic radical such as a phenyl or substituted phenyl radical, although this latter type of compound is not in general as effective as the hydroxyl derivatives and the salts formed therefrom. The class of compound having important advantages may be represented by the formula: RHgX in which R represents an aromatic radical, linked through a carbon to the mercury, with or without substituents such as alkyl groups, halogens, nitrile groups, amino and substituted amino groups, hydroxyl groups, complex organic groups, etc., and X represents the hydroxyl group, or an acidic radical, such as the acetate radical, chlorine, the nitrate radical, etc. Among the specific mercurials which have been found to be advantageous are sodium-ethyl-mercuri-thiosalicylate, sodium-oxymercuri-ortho-nitrophenolate, diacetoxymercuri -4- nitro -2- cresol, orthochloro-mercuri-phenol, tolyl-mercuri-nitrate, phenyl-mercuri-nitrate, phenyl-mercuri-acetate, tolyl-mercuri-acetate, and their congeners and homologues. A group of organic mercurials having outstanding advantages are the chloro-mercuri derivatives of phenols, including that specifically mentioned above, and related compounds, such as the corresponding nitrates, acetates, etc.

The class of compounds herein considered is well understood, and a number of them have been subjected to extended pharmacological and biological study. Individual members of the groups have varying preservative properties and varying toxicities, and it is to be understood that the compounds used are advantageously selected so that they have a maximum bactericidal or bacteriostatic action and a minimum toxicity. The eight compounds specifically mentioned above represent typical examples of the organic mercurials which may be used with advantage, these compounds having a relatively high activity and low toxicity.

Dilutions of these organic mercurial compounds, in the biologically active substance, of 1 to 10,000 and greater, as well as stronger concentrations, are quickly germicidal and sterilize the liquid biologically active substance in a few minutes time.

After the mercurial has been added to the original liquid biologically active substance, the substance is converted to a solid lyophilic state by subjecting it to rapid freezing and removal of water therefrom by the application of a high vacuum without melting or softening it, so that there is obtained a solid lyophilic biologically active substance having the mercurial intimately dispersed therethrough, but effectively prevented from becoming chemically bound with the proteins or other constituents by the absence of water. When the solid lyophilic product is restored by the addition of aqueous liquid, there is obtained a solution containing an active sterilizing agent, even though the restoration takes place many months after the original desiccation. Once the material has been restored to a liquid state, however, the mercurial loses its effectiveness in about the same way as it loses its effectiveness in the original liquid biologically active substance, so that after a relatively short time the restored solution contains substantially no active sterilizing agent, all of the mercurial having become bound or otherwise rendered inert by the biologically active substance.

It will thus be seen that the present invention provides means by which a mercurial preparation may be incorporated in a biologically active substance in such a way that even if the biologically active substance is not used for a long period of time after the incorporation of the mercurial, the germicidal activity of the mercurial is retained, and the biologically active substance is not only kept sterile during the period of storage, but contains an active sterilizing agent to prevent contamination when the material is used or restored.

I claim:

1. The improvement in the production of solid lyophilic biologically active substances by rapid freezing of liquid biologically active substances and the removal of water therefrom while in a solid frozen state under a high vacuum, which comprises adding to the liquid biologically active substance, shortly before it is subjected to such treatment, a small amount of an organic mercurial having one bond of the mercury linked directly to a carbon of a benzene ring structure.

2. The improvement in the production of solid lyophilic biologically active substances by rapid freezing of liquid biologically active substances and the removal of water therefrom while in a solid frozen state under a high vacuum, which comprises adding to the liquid biologically active substance, shortly before it is subjected to such treatment, a small amount of mercuri-phenol in which the mercury is attached directly to a carbon of the benzene ring structure.

3. The improvement in the production of solid lyophilic biologically active substances by rapid freezing of liquid biologically active substances and the removal of water therefrom while in a solid frozen state under a high vacuum, which comprises adding to the liquid biologically active substance, shortly before it is subjected to such treatment, a small amount of ortho-chloro-mercuri-phenol.

4. The improvement in the production of solid lyophilic biologically active substances by rapid freezing of liquid biologically active substances and the removal of water therefrom while in a solid frozen state under a high vacuum, which comprises adding to the liquid biologically active substance, shortly before it is subjected to such treatment, a small amount of a phenyl-mercuri salt in which the mercury is attached directly to a carbon of the benzene ring structure.

5. As new products, sterilized lyophilic sera and other biologically active substances in a lyophilic, porous, solid state, which when water is added thereto, will readily combine therewith to form a liquid product similar to the original fresh material and which products contain therein a small amount of an organic mercurial having one bond of the mercury linked directly to a carbon of a benzene ring structure.

6. As new products, sterilized lyophilic sera and other biologically active substances in a lyophilic, porous, solid state, which when water is added thereto, will readilly combine therewith to form a liquid product similar to the original fresh material and which products contain therein a small amount of a mercuri-phenol in which the mercury is attached directly to a carbon of the benzene ring structure.

7. As new products, sterilized lyophilic sera and other biologically active substances in a lyopholic, porous, solid state, which when water is added thereto, will readily combine therewith to form a liquid product similar to the original fresh material and which products contain therein a small amount of ortho-chloro-mercuri-phenol.

8. As new products, sterilized lyophilic sera and other biologically active substances in a lyophilic, porous, solid state, which when water is added thereto, will readily combine therewith to form a liquid product similar to the original fresh material and which products contain therein a small amount of a phenyl-mercuri salt in which the mercury is attached directly to a carbon of the benzene ring structure.

JOHN REICHEL.

CERTIFICATE OF CORRECTION.

Patent No. 2,099,659.　　　　　　　　　　　　　　November 16, 1937.

JOHN REICHEL.

It is hereby certified that error appears in the printed specification of the above numbered patent requiring correction as follows: Page 2, second column, line 15, before "mercuri-phenol" insert the article a; and that the said Letters Patent should be read with this correction therein that the same may conform to the record of the case in the Patent Office.

Signed and sealed this 15th day of February, A. D. 1938.

(Seal)

Henry Van Arsdale,
Acting Commissioner of Patents.